United States Patent [19]
Elder

[11] Patent Number: 6,159,092
[45] Date of Patent: Dec. 12, 2000

[54] AIR VENT HAVING TWO COPLANAR VANE SETS

[75] Inventor: Jack E. Elder, Rochester, Mich.

[73] Assignee: Fickenscher America, L.L.C., Richmond, Ind.

[21] Appl. No.: 09/144,162

[22] Filed: Aug. 31, 1998

[51] Int. Cl.[7] .................................................. B60H 1/34
[52] U.S. Cl. ........................... 454/155; 454/152; 454/314
[58] Field of Search .................................... 454/314, 152, 454/155

[56] References Cited

U.S. PATENT DOCUMENTS

| | | | |
|---|---|---|---|
| 2,892,395 | 6/1959 | Goettl | 454/314 |
| 2,939,376 | 6/1960 | Goettl | 454/314 |
| 2,959,117 | 10/1960 | Wright et al. | 454/314 |
| 2,996,970 | 8/1961 | Goettl | 454/314 |
| 3,045,576 | 7/1962 | Goettl | 454/314 |
| 3,096,703 | 7/1963 | Goettl | 454/314 |
| 3,572,233 | 3/1971 | Bar et al. | 454/152 |
| 4,377,107 | 3/1983 | Izumi | 454/314 |
| 4,614,151 | 9/1986 | Elverson . | |
| 5,036,753 | 8/1991 | Ostrand et al. . | |
| 5,259,815 | 11/1993 | Stouffer et al. . | |
| 5,297,989 | 3/1994 | Stouffer et al. . | |
| 5,356,336 | 10/1994 | Stouffer et al. . | |
| 5,385,503 | 1/1995 | Stouffer et al. . | |
| 5,480,350 | 1/1996 | Naruse . | |
| 5,482,506 | 1/1996 | Tsuda et al. . | |
| 5,591,079 | 1/1997 | Saida . | |
| 5,690,550 | 11/1997 | Mikowski . | |
| 5,741,179 | 4/1998 | Sun et al. | 454/155 |
| 5,816,907 | 10/1998 | Crockett | 454/155 |
| 5,890,958 | 4/1999 | Greiner et al. | 454/152 |

FOREIGN PATENT DOCUMENTS

| | | | |
|---|---|---|---|
| 885917 | 1/1962 | United Kingdom | 454/314 |
| 885918 | 1/1962 | United Kingdom | 454/314 |

*Primary Examiner*—Harold Joyce
*Assistant Examiner*—Derek S. Boles
*Attorney, Agent, or Firm*—Maginot, Addison & Moore

[57] ABSTRACT

An air vent assembly for directing airflow includes a housing having an inlet and an outlet. The air vent assembly further includes a first plurality of vanes, each of said first plurality of vanes rotatably secured to the housing. A first link member is rotatably secured to each of the first plurality of vanes such that rotation of one of the plurality of first vanes rotates each of the first vanes. The air vent assembly further includes a second plurality of vanes, each second vane is rotatably secured to the housing. A second link member is rotatably secured to each of the plurality of second vanes such that rotation of one of the plurality of second vanes rotates each of the plurality of second vanes. Each of the first vanes rotates about one of a first set of parallel axes and each of the second vanes rotates about one of a second set of parallel axes. The first set of axes is coplanar with, and nonparallel to, and the second set of axes.

20 Claims, 2 Drawing Sheets

AIR VENT HAVING TWO COPLANAR VANE SETS

FIELD OF THE INVENTION

The present invention relates generally to a vehicle air vent, and more specifically to a vehicle air vent having two sets of orthogonal vanes.

BACKGROUND OF THE INVENTION

Air vents are employed to direct the flow of processed or vented air from a heating and air conditioning system to an area to be affected. In many situations, it is desirable that a human operator be capable of directing the air flow to a select location. By way of example, an air vent employed in a motor vehicle directs air flow from the dashboard or console of the motor vehicle to a location in the passenger compartment that requires processed air. To this end, one or more controls are provided that allow the driver or passenger to operate the air vent so as to direct the air flow to the desired location.

Because the primary purpose of the air vent is to direct the flow of processed air, it is desirable that the air vent exhibit good air flow directability. In other words, the air vent should effectively direct air flow in the direction intended by the operator. Moreover, air vents should be capable of controllably directing air in both the vertical and horizontal directions.

In addition to good air flow directability, air vents are preferably easy to control and adjust. For example, because a driver of a vehicle must concentrate on a number of other controls required to operate the vehicle, it is necessary that the air vent controls if the vehicle be intuitive and simple to operate so as not to distract the driver from the more important task of operating the vehicle.

Air vents employed in vehicles, as well as in other environments, also have a function as a styling element. In vehicles, air vents are prominently placed on the dashboard or console. Accordingly, the driver and passengers have an unobstructed view of the air vents. Therefore, it is important that the air vents are aesthetically pleasing to the driver and passengers of the vehicle. To create an aesthetically pleasing appearance, air vents are preferably integrated into the overall design of the passenger compartment of the vehicle. To this end, it is often desirable to at least partially conceal the inner components of the air vent from the driver and passengers to increase the aesthetic appeal of the air vent.

One common air vent configuration that attempts to address the above concerns is a barrel-type vent, such as the air vent is described by Mikowski in U.S. Pat. No. 5,690,550. A barrel-type vent includes a rotatable barrel and a set of rotating vanes. The barrel has a number of fixed parallel vanes which direct the air flow in accordance with the rotational position of the barrel. The set of rotating vanes are positioned behind the barrel, and each rotating vane is connected to the other rotating vanes by a link bar which links the rotating vanes to one another such that each vane rotates on its axes at the same rate as the other rotating vanes. A knob is used to rotate one of the rotating vanes, causing the link bar to slide back and forth, which in turn rotates each of the other rotating vanes about its respective axis.

One drawback of the barrel-type vent design is that the control and operation of the vent is not intuitive. To direct the airflow up and down, the barrel must be rotated relative to the dashboard whereas to direct airflow left and right, the knob is urged to slide the link bar relative to the barrel. As a result, two types of control actions, with two distinct types of tactile feedback, are used to perform the directional adjustment. Using such distinctly different control actions for a similar task makes directing air flow with this type of air vent non-intuitive.

Another drawback to the device disclosed in the Mikowski patent is that the set of rotating vanes is located behind the barrel. As a result, the air directing influence of the rear-located rotating vanes is diminished. In particular, any left or right air flow influence or direction occurs deep within the vent (due to the location of the vane set behind the barrel) and is therefore muted by counter air currents reflecting off of the sides of the vent before the air exits the vent into the passenger compartment. As a result, air flow is not directed to the intended portion of the passenger compartment with great effectiveness.

Still another drawback of the barrel-type vent is that the vertically rotating barrel is not aesthetically pleasing because multiple vents having barrels in different stages of rotation cause the dash to appear aesthetically unbalanced.

One proposed solution to the problem of using two types of control actions is to have two sets of rotating vanes controlled by a single control knob. A vent that incorporates a single control knob feature is disclosed in U.S. Pat. No. 5,480,350 to Naruse. The Naruse patent shows a first set of rotating vanes that is positioned in front of a second set of rotating vanes. The control knob rotates the first set of vanes about a first set of axes to direct the flow of air either upward or downwardly. An engagement portion of the control knob passes through the first set of vanes and is operable to cause the second set of vanes to rotate about a second set of axes positioned behind the first set of axes. This configuration allows the airflow to be directed left or right with the second set of vanes using a motion similar to the motion used to direct the airflow up and down with the first set of vanes.

While the controls in the device disclosed in Naruse are more intuitive than those associated with barrel-type vents, such controls nevertheless have drawbacks. For example, like the barrel-type vent designs, one vane set is located squarely behind the other vane set, in other words, deep within the vent. Accordingly, for the same reasons as those discussed above in connection with the Mikowski patent, such a configuration results in limited effectiveness of the air flow directability of the rear vane set.

Yet another solution to the problems associated with the barrel-type air vent is described by Stouffer in U.S. Pat. No. 5,356,336. This air vent configuration uses a joystick to move an open frame in a duct of the vent. The open frame has a number of vanes which are oriented in a substantially parallel manner. The joystick acts a single point controller and allows the driver or passenger to pivot the frame up, down, left and right about a ball joint. The ball joint provides the operator with substantially identical feed back in all directions, allowing intuitive operation of the vent. The frame directs the air that exits the vent in a direction parallel to the vanes. The Stouffer design also includes a grill which is operable to visually conceal the inner components of the vent from the driver and passengers.

However, one disadvantage of the Stouffer design is that the size of the frame that directs the air flow must be significantly smaller than the size of the duct in order to allow the frame to be positioned within the duct. Limiting the size of the frame limits the surface area of the vanes which is used to direct the air flow. By limiting the surface area of the vanes, a smaller portion of air that exits the air vent is effectively directed by the frame. As a result, the vent described in the Stouffer patent exhibits reduced effectiveness in air flow directability.

What is needed therefore is an apparatus and method for controlling the flow of air in a vent which has improved air directability combined with intuitive control action. A further need exists for such an apparatus to use a single point controller, such as a joystick, to direct both a first set of vanes and a second set of vanes. Still a further need exists for such an apparatus that provides at least partial concealment of the components of the apparatus.

SUMMARY OF THE INVENTION

The present invention addresses the above needs, as well as others, by providing a method and apparatus for controlling the flow of air in a vent which employs a first set of linked rotating vanes which each rotate about a first set of axes and a second set of linked rotating vanes which rotate about a second set of axes that lie in the same plane as the first set of axes. The second set of vanes are oriented to direct air in a different direction than the first set of rotating vanes. Because the first set of axes of rotation and the second set of axes of rotation lie in the same plane, the first and second vane sets may both be closely located to the vent outlet, thereby providing improved air flow directability. Moreover, the above configuration is readily controlled by an intuitive control knob such as a joystick.

In accordance with a first embodiment of the present invention, there is provided an air vent assembly for directing air flow to a desired location. The air vent assembly includes a housing having an inlet and an outlet. The air vent assembly further includes a first plurality of vanes, each of said first plurality of vanes rotatably secured to the housing. A first link member is rotatably secured to each of the first plurality of vanes such that rotation of one of the plurality of first vanes rotates each of the first vanes. The air vent assembly further includes a second plurality of vanes, each second vane is rotatably secured to the housing. A second link member is rotatably secured to each of the plurality of second vanes such that rotation of one of the plurality of second vanes rotates each of the plurality of second vanes. Each of the first vanes rotates about one of a first set of parallel axes and each of the second vanes rotates about one of a second set of parallel axes. The first set of axes is coplanar with, and nonparallel to, and the second set of axes.

This invention has the advantage of using a first set of linked rotating vanes which each rotate about a first set of axes and a second set of linked rotating vanes which rotate about a second set of axes that lie in the same plane as the first set of axes. Because the first set of axes and the second set of axes lie in the same plane, both the first set of vanes and the second set of vanes may be located close to the outlet of the vent, thereby improving the air directability effectiveness. Additionally, a single point controller, such as a joystick, is preferably provided. The joystick rotates about a ball joint which also lies in the same plane as the first and second set of axes. Because the joystick has rotates in a single common plane used by the first set of vanes as well as the second set of vanes, the joystick moves the first set of vanes, or the second set of vanes with a similar, but orthogonal action.

The above features and advantages, as well as others, will become readily apparent to those of ordinary skill in the art by reference to the following detailed description and accompanying drawings.

DETAILED DESCRIPTION

Figure 1:
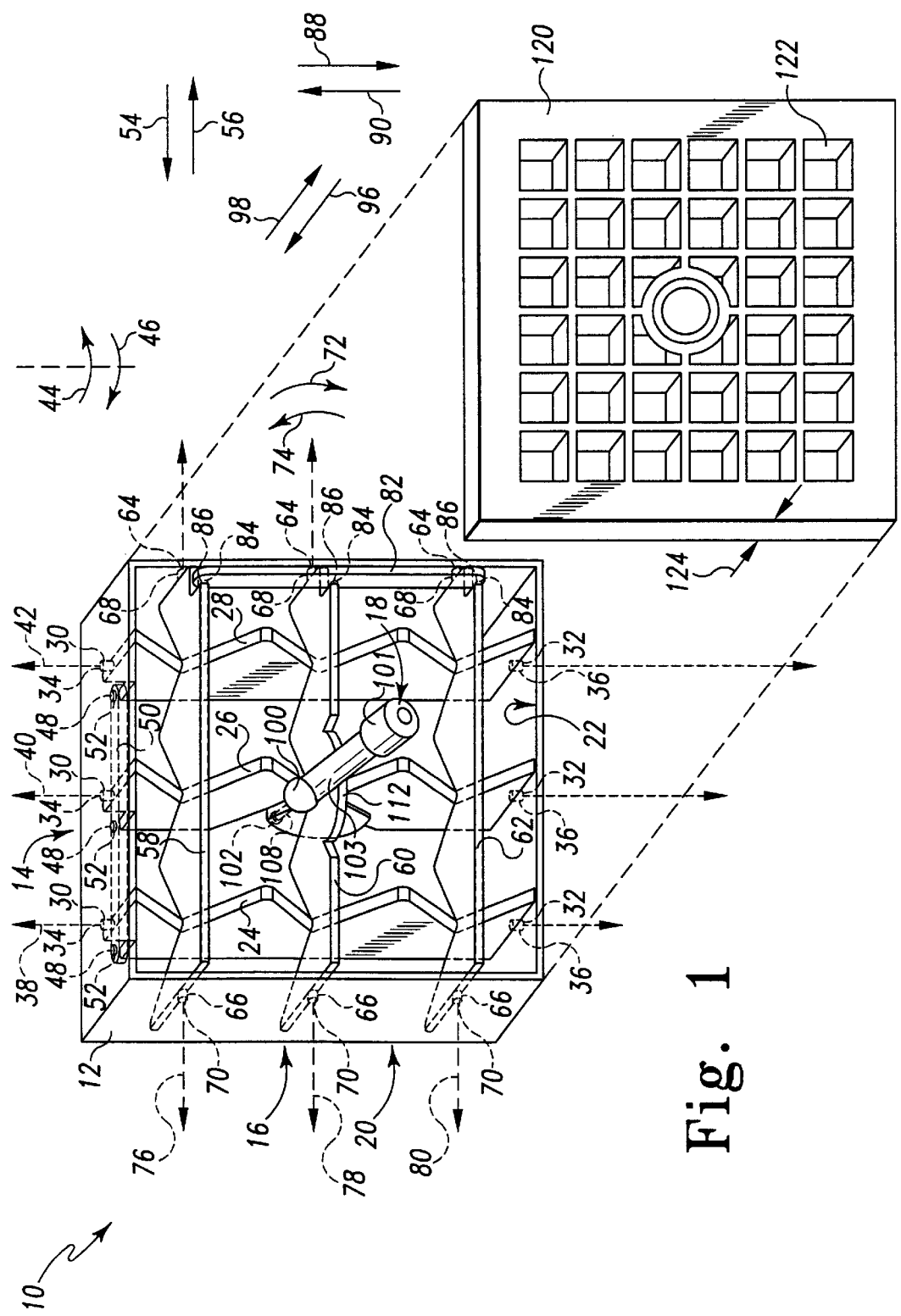
FIG. 1 is a front perspective view of the air vent assembly which incorporates the features of the present invention therein, note that the grill has been exploded for clarity of description.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 shows an exemplary air vent assembly 10 according to the present invention. The air vent assembly 10 includes a housing 12, a first vane set 14, a second vane set 16, and a joystick 18. In the embodiment described herein, the air vent assembly 10 may suitably be installed into a motor vehicle. It will be appreciated, however, that the air vent assembly of the present invention is in no way limited to use in vehicular environments.

In the embodiment described herein, the housing 12 includes an inlet 20 and an outlet 22. The inlet 20 is coupled to a ventilation duct system (not shown). The ventilation duct system is operative to provide a quantity of processed air, i.e. either heated, vented, or cooled air, to a desired location, such as, for example, the passenger compartment of the vehicle. In the case of a vehicle, the outlet 22 is positioned on a dashboard, a console, or other area of the passenger vehicle. The air vent assembly 10 is operative to direct the air flow from the ventilation system to an area vehicle selected by an operator through operation of the joystick 18.

The first vane set 14 preferably includes a plurality of vanes. In the exemplary embodiment described herein, the first vane set 14 comprises three vertically oriented vanes. In particular, the exemplary first vane set 14 includes a left vertical vane 24, a central vertical vane 26, and a right vertical vane 28. Each of the vertical vanes 24, 26, and 28 includes an upper pin 30 and a lower pin 32. Each of the upper pins 30 is received through a respective pin aperture 34 defined in the housing 12. Similarly, each of the lower pins 32 is received through a respective pin aperture 36 defined in the housing 12. The left vertical vane 24 rotates about an axis 38 in the general direction of arrows 44 and 46. Similarly, the center vertical vane 26 rotates about an axis 40 in the general direction of arrows 44 and 46, and the right vertical vane 28 rotates about an axis 42 also in the general direction of arrows 44 and 46. The axis 38, the axis 40 and the axis 42 collectively define a first set of substantially parallel axes.

Figure 2:
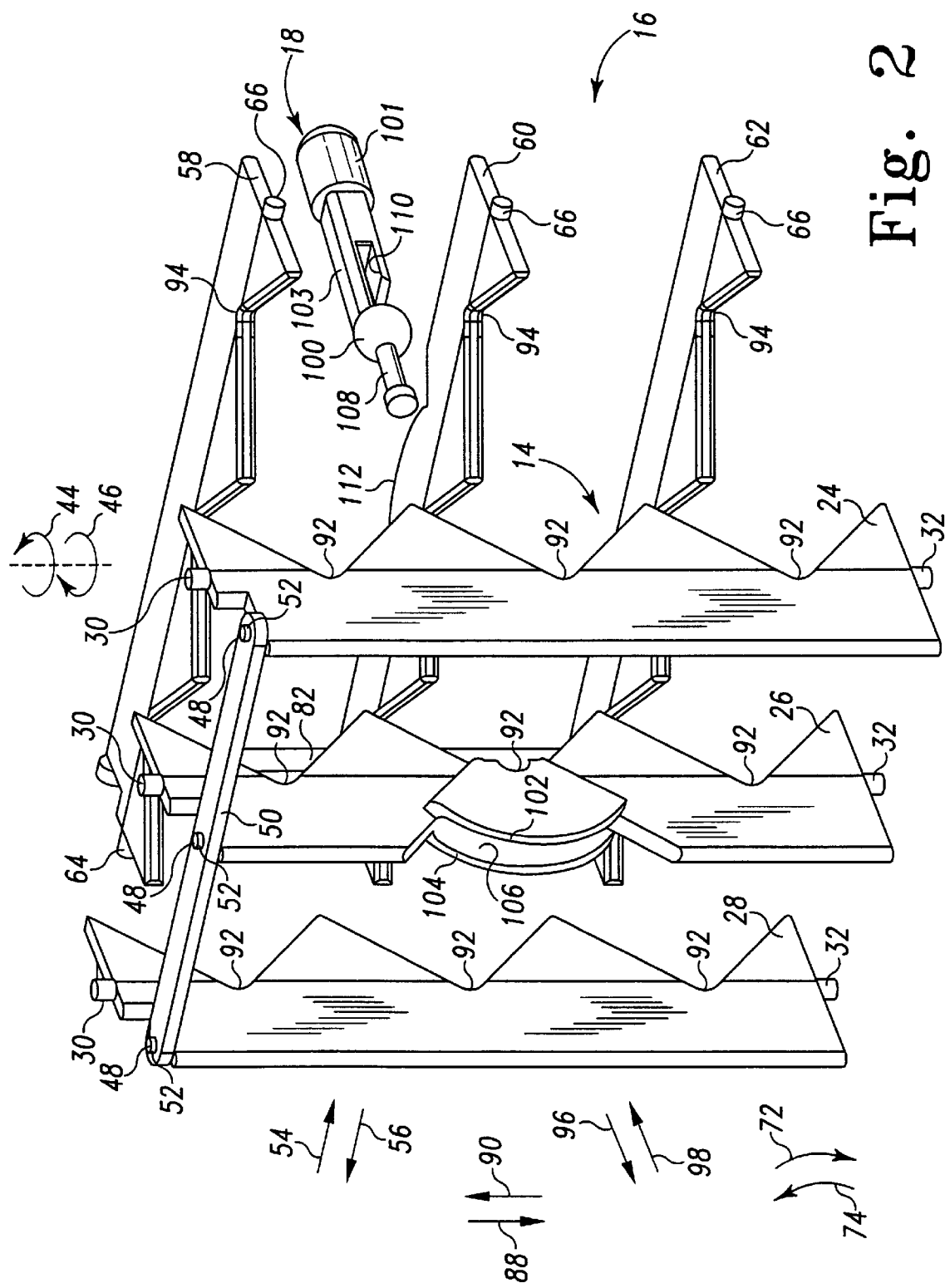
FIG. 2 is a partially exploded rear perspective view of the air vent assembly of FIG. 1, note the housing and grill have been removed for clarity of description.

Referring now to FIG. 2, a horizontal link member 50 links the left vertical vane 24, central vertical vane 26, and right vertical vane 28 such that all of the vertical vanes 24, 26, and 28 rotate substantially together. In particular, each of the vertical vanes 24, 26, and 28 further includes a link pin 48. The link pin 48 of each vertical vanes 24, 26, 28 is received through a respective aperture 52 defined in the horizontal link member 50. As the horizontal link member 50 is advanced in the general direction of arrow 54, each of the link pins 48 is advanced in the general direction of arrow 54. Advancing a respective link pin 48 in the general direction of arrow 54 causes each of the respective vertical vanes 24, 26, and 28 to rotate in the general direction of arrow 44 about the respective axis 38, 40, or 42 (shown in FIG. 1).

The second vane set 16 also preferably includes a plurality of vanes. In the exemplary embodiment described herein, the second vane set 16 comprises three horizontally oriented vanes. In particular, the exemplary second vane set 16 includes an upper horizontal vane 58, a middle horizontal vane 60, and a lower horizontal vane 62. Each of the horizontal vanes 58, 60, and 62 includes a right pin 64 and a left pin 66. Each of the right pins 64 is received through a respective pin aperture 68 defined in the housing 12. Similarly, each of the left pins 66 is received through a respective pin aperture 70 defined in the housing 12. The upper horizontal vane 58 is free to rotate about an axis 76 in the general direction of arrows 72 and 74. Similarly, the middle horizontal vane 60 is free to rotate about an axis 78 also in the general direction of arrows 72 and 74. Likewise, the lower horizontal vane 62 is free to rotate about an axis 80 also in the general direction of arrows 72 and 74. The axes 76, 78 and 80 collectively define a second set of substantially parallel axes.

A vertical link member 82 links each of the horizontal vanes 58, 60, and 62 such that the horizontal vanes 58, 60, and 62 rotate substantially together. In particular, each of the horizontal vanes 58, 60, and 62 further includes a link pin 84. The link pin 84 of each horizontal vanes 58, 60, 62 is received through a respective aperture 86 defined in the vertical link bar 82. As the vertical link bar 82 is advanced in the general direction of arrow 88, each of the link pins 84 is advanced in the general direction of arrow 88. Advancing a link pin 84 in the general direction of arrow 88 causes each of the respective horizontal vanes 58, 60, and 62 to rotate in the general direction of arrow 72. Similarly, advancing a link pin 84 in the general direction of arrow 90 causes each of the respective horizontal vanes 58, 60, and 62 to rotate in the general direction of arrow 74 about the respective axes 76, 78, or 80.

According to the present invention, the first set of substantially parallel axes 38, 40, and 42 of the first vane set 14 are coplanar with the second set of substantially parallel axes 76, 78, and 80 of the second vane set 16. To prevent the first vane set 14 from interfering with the rotation of the second vane set 16, while rotating within the same plane, each of the vertical vanes 24, 26, and 28 has vane-receiving notches 92 defined therein. In particular, each of the vertical vanes 24, 26 and 28 has three substantially "V"-shaped vane-receiving notches 92 defined therein. Each of the notches 92 allows a corresponding horizontal vane 58, 60, or 62 to rotate about a respective axis 76, 78, or 80 in the general direction of arrows 72 and 74. In particular, the notch 92 defined in the uppermost portion of the vertical vanes 24, 26, and 28 allows the upper horizontal vane 58 to rotate about the axis 76 in the general direction of arrows 72 and 74. In addition, the notch 92 defined in the center portion of the vertical vanes 24, 26, and 28 allows the middle horizontal vane 60 to rotate about the axis 78 in the general direction of arrows 72 and 74. Furthermore, the notch 92 defined in the lower portion of the vertical vanes 24, 26, and 28 allows the lower horizontal vane 62 to rotate about the axis 80 in the general direction of arrows 72 and 74.

Likewise, to prevent the second vane set 16 from interfering with the rotation of the first vane set 14, each of the horizontal vanes 58, 60, and 62 has corresponding vane-receiving notches 94 defined therein. Each of the notches 94 allows a respective vertical vane 24, 26, or 28 to rotate about a respective axis 38, 40, or 42 in the general direction of arrows 44 and 46. In particular, the notch 94 defined in the left portion of the horizontal vanes 58, 60, and 62 allows the left vertical vane 24 to rotate about the axis 38 in the general direction of arrows 44 and 46. In addition, the notch 94 defined in the middle portion of the horizontal vanes 58, 60, and 62 allows the central vertical vane 26 to rotate about the axis 40 in the general direction of arrows 44 and 46. Furthermore, the notch 94 defined in the right portion of the horizontal vanes 58, 60, and 62 allows the right vertical vane 28 to rotate about the axis 42 in the general direction of arrows 44 and 46.

Referring now to FIGS. 1 and 2, the joystick 18 is operatively coupled to effectuate independent movement of both the first vane set 14 and the second vane set 16. To this end, the joystick 18 in the exemplary embodiment described herein includes ball joint 100 disposed between a forward shaft 103 and a rear shaft 108. Preferably, a control knob 101 is provided at the end of the forward shaft 103.

The ball joint 100 is rotatably seated between the notch 94 in the middle portion of the central horizontal vane 60 and the notch 92 in the central portion of the central vertical vane 26. The notch 92 in the central portion of the central vertical vane 26 is slightly larger than the other notches 92 and serves as a socket for the ball joint 100. Accordingly, the ball joint 100 is free to pivot in the general directions of arrows 44, 46, 74, or 76, or any combination thereof.

In general, the forward shaft 103 effectuates movement of the first vane set 14 independent of the second vane set 16, and the rear shaft 108 effectuates movement of the second vane set 16 independent of the first vane set 14. To this end, the forward shaft 103 includes a shaft slot 110 configured to receive the central horizontal vane 60. The central horizontal vane 60 is received by the shaft slot 110 such that horizontal pivotal motion of the forward shaft 103 does not cause significant movement of the central horizontal vane 60, while vertical pivotal motion of the forward shaft 103 engages and imparts vertical rotational motion to the central horizontal vane 60. It should be noted the middle horizontal vane 60 has an arcuate cutout 112 defined therein, which allows the forward shaft 103 to rotate about the ball joint 100 in the horizontal direction without coming into contact with the middle horizontal vane 60.

Moreover, the central vertical vane 26 includes a left plate 102 and a right plate 104 disposed generally vertically and opposite each other, thereby defining a vertical slot 106 in the central vertical vane 26. The vertical slot 106 is advantageously configured to receive the rear shaft 108 such that vertical pivotal motion of the rear shaft 108 does not cause significant movement of the central vertical vane 26, while horizontal pivotal motion of the rear shaft 108 engages and imparts horizontal rotational motion to the central vertical vane 26.

As a result of the configuration of the shaft slot 110 and the vertical slot 106, the joystick 108 is capable of independently and combinatorily adjusting the position of the first vane set 14 and the second vane set 16.

Referring again to FIG. 1, the air vent assembly 10 may further include a stationary grill 120 (shown exploded from the housing 12) secured to the outlet 22 of the housing 12. The optional stationary grill 120 includes a joystick aperture 123 and a plurality flow passages 122. The control knob 101 of the joystick 18 is received through the joystick aperture 123 so as to allow manipulation of the control knob 101 when the stationary grill 120 covers the outlet 22 of the air vent assembly 10.

Each of the flow passages 122 is formed through the stationary grill 120 and has a length that is equal to the thickness 124 of the stationary grill 120. The thickness 124 is a compromise between two competing design goals. The first design goal is to avoid redirecting the airflow that exits the outlet 22 as it passes through the flow passages 122. If the thickness 124 is too great, then the flow passages 122 will significantly redirect the air flow otherwise directed by the vertical vane set 14 and the horizontal vane set 16. The second design goal is to use the stationary grill 120 is to at least partly conceal the inner components of the air vent assembly 10 from being externally viewed by the operator and other individuals. To that end, if the flow passages 122 are too thin, then the air vent components that lie behind the stationary grills 120 may undesirably become more visible to the operator or other individuals. Those of ordinary skill in the art may determine the appropriate thickness 124 based on various well-known design factors.

In operation, when the user or operator desires to direct the airflow to a select location in the passenger compartment located above the air vent assembly 10, operator moves the control knob 101 of the joystick 18 in the general direction of arrow 90. By moving the control knob 101 in the general direction of arrow 90, the forward shaft 103 of the joystick 18 is urged into contact with the middle horizontal vane 60, so as to cause the middle horizontal vane 60 to rotate in the general direction of arrow 74 about the axis 78. Because the middle horizontal vane 60 is linked to the upper horizontal vane 58 and the lower horizontal vane 62 via the vertical linkage 82, rotation of the middle horizontal vane 60 in the general direction of arrow 74 causes both the upper horizontal vane 58 and the lower horizontal vane 62 to rotate parallel to each other in the general direction of arrow 74. Thus, the upper horizontal vane 58, the middle horizontal vane 60, and the lower horizontal vane 62 are all positioned to direct airflow to a location above the air vent assembly 10.

Similarly, when the operator desires to direct the airflow to a select location below the air vent assembly 10, the operator moves the control knob 101 of the joystick 18 in the general direction of arrow 88. By moving the control knob 101 in the general direction of arrow 88, the forward shaft 103 of the joystick 18 is urged into contact with the middle horizontal vane 60, so as to cause the middle horizontal vane 60 to rotate in the general direction of arrow 72 about the axis 78. Because the middle horizontal vane 60 is linked to the upper horizontal vane 58 and the lower horizontal vane 62 via the vertical linkage 82, rotation of the middle horizontal vane 60 in the general direction of arrow 72 causes both the upper horizontal vane 58 and the lower horizontal vane 62 to rotate parallel to each other in the general direction of arrow 72. Thus, the upper horizontal vane 58, the middle horizontal vane 60, and the lower horizontal vane 62 are all positioned to direct airflow to a location below the air vent assembly 10.

In addition, when the operator desires to direct the airflow to a select location to the right of the air vent assembly 10, the operator moves the control knob 101 of the joystick 18 in the general direction of arrow 56. By moving the control knob 101 in the general direction of arrow 56, the rear shaft 108 of the joystick 18 is urged into contact with the left plate 102 of the middle vertical vane 26, so as to cause the middle vertical vane 26 to rotate in the general direction of arrow 44 about the axis 40. Because the middle vertical vane 26 is linked to the left vertical vane 24 and the right vertical vane 28 via the horizontal linkage 50, rotation of the middle vertical vane 26 in the general direction of arrow 44 causes both the left vertical vane 24 and the right vertical vane 28 to rotate parallel to each other in the general direction of arrow 44 about the axis 38 and axis 42 respectively. Thus, the right vertical vane 24, the central vertical vane 26, and the left vertical vane 28 are all positioned to direct airflow to a location to the left of the air vent assembly 10.

Likewise, when the operator desires to direct the airflow to a select location to the left of the air vent assembly 10, the operator moves the control knob 101 of the joystick 18 in the general direction of arrow 54. By moving the control knob 101 in the general direction of arrow 54, the rear shaft 108 of the joystick 18 is urged into contact with the right plate 104 of the middle vertical vane 26, so as to cause the middle vertical vane 26 to rotate in the general direction of arrow 46 about the axis 40. Because the middle vertical vane 26 is linked to the left vertical vane 24 and the right vertical vane 28 via the horizontal link bar 50, rotation of the middle vertical vane 26 in the general direction of arrow 46 causes both the left vertical vane 24 and the right vertical vane 28 to rotate parallel to each other in the general direction of arrow 46 about the axis 38 and axis 42 respectively. Thus, the right vertical vane 24, the central vertical vane 26, and the left vertical vane 28 are all positioned to direct airflow to a location to the right of the air vent assembly 10.

It should be appreciated that the operator can direct the airflow to any position which involves a combination of upward or downward movement and left or right movement because the ball joint 100 allows any combination of upward or downward movement in the general direction of the arrows 74 and 72 respectively and left or right movement in the general direction of arrows 46 and 44 respectively. For example, if a driver or passenger desires to direct the airflow to a location in the passenger compartment which lies above and to the left of the air vent assembly 10, the control knob 101 of the joystick 18 is moved in the general direction of arrow 90 and simultaneously moved in the general direction of arrow 54. This movement of the control knob 101 will cause the vertical vanes 24, 26, and 28 to be rotated in the general direction of arrow 46 whereas the horizontal vanes 58, 60, and 62 will be caused to rotate in the general direction of arrow 74.

An advantage of the present invention over air vents that have heretofore been designed is that the axes of rotation 38, 40, and 42 of the vertical vanes 24, 26, and 28 lie in the same plane as the axes of rotation 76, 78, and 80 of the horizontal vanes 58, 60, and 62. Placing the vertical axes of rotation 38, 40, and 42 in the same plane as the horizontal axes of rotation 58, 60, and 62 has a significant advantage of enabling both vane sets to be located in close proximity to the outlet of the vent. The close location of the vane sets to the outlet provides more effective air flow directability than prior designs in which one vane set was seated deep within the vent.

The present invention also has the advantage of simultaneously directing the air in the vertical as well as horizontal directions. Air vents which have heretofore been designed with two sets of rotating vanes have passed the air flow through a first set of vanes prior to being passed through the second set of vanes. By directing the air flow in both the vertical and horizontal directions at the same time, the air flow is directed in both directions while passing through a single flow restriction rather than a pair of restrictions. By reducing the number of flow restrictions to the air which passes through the air vent assembly 10, the air flow that exits the air vent assembly 10 may exit at a greater velocity than airflow that is passed through two restrictions to prior to exiting the air vent assembly 10.

Moreover, the coplanar axes of rotation of the two vane sets provides an advantage of directing the airflow a consistent amount for a given movement of the joystick. For example, movement of the control knob 101 a distance of x in the general direction of arrow 56 may cause the central vertical vane 26 to deflect the air flow y degrees about the axis 40 from the previous flow direction. Because the central horizontal vane 60 rotates about the axis 78 that lies in the same plane as the as the axis 40, movement of the control knob 101 a distance of x in the general direction of arrow 88, will also rotate the central horizontal vane 60 y degrees and deflect the airflow y degrees from its previous direction. If the axis 78 had been placed behind the axis 40, then movement of the control knob 101 an amount x in the general direction of arrow 88 would cause a the central horizontal vane 60 to rotate in the general direction of arrow 74 an amount greater than y in the general direction of arrow 54. Thus, the coplanar positioning of the vertical and horizontal axes allows movement of the joystick 18 to direct the air flow a consistent amount in any direction proportional to the movement of the joystick 18. The consistent relationship between control knob movement and vertical and horizontal air flow direction results in a more intuitive vent control.

While the present invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the axes of rotation of the first and second vane sets in the disclosed embodiment extend in directions generally perpendicular with respect to each other, the vent disclosed may readily be modified to include first and second vane sets having axes of rotation that extend to a different, yet non-parallel angle with respect to each other.

Moreover, while the embodiment described herein incorporates three vanes in each of the first and second vane sets, it will be appreciated that the first and second vane sets may include any suitable number of vanes.

What is claimed is:

1. An air vent assembly for directing airflow to a select location, said air vent assembly comprising:

a housing having an inlet and an outlet;

a first plurality of vanes, each of said first plurality of vanes including a first plurality of v-shaped notches, each of said first plurality of vanes being rotatably secured to the housing about one of a first set of substantially parallel axes;

a first link member rotatably secured to each vane of said first plurality of vanes such that rotation of one of said first plurality of vanes causes each of said first plurality of vanes to rotate;

a second plurality of vanes, each of said second plurality of vanes including a second plurality of v-shaped notches, each of said second plurality of vanes being rotatably secured to the housing about one of a first set of substantially parallel axes;

a second link member rotatably secured to each vane of said second plurality of vanes such that rotation of one of said second plurality of vanes causes each of said second plurality of vanes to rotate;

a joystick operably coupled to cause each vane of the first plurality of vanes to rotate about of one said first set of axes and to cause each vane of the second plurality of vanes to rotate about one of said second set of axes, said joystick including a ball joint;

and wherein each of said first set of axes extends in a substantially non-parallel direction with respect to each of said second set of axes, and wherein the first set of axes and the second set of axes are substantially coplanar.

2. The air vent assembly of claim 1, wherein each of said first set of axes extends in a direction that is substantially perpendicular with respect to each of said second set of axes.

3. The air vent assembly of claim 1, wherein said joystick comprises:

a ball joint disposed substantially coplanar with the first set of axes and the second set of axes;

a forward shaft engaging at least one of the first plurality of vanes to impart rotational motion thereto; and a rear shaft engaging at least one of the second plurality of vanes to impart rotational motion thereto.

4. The air vent assembly of claim 1, further comprising a stationary grill covering said outlet of said housing.

5. The air vent assembly of claim 4, wherein said stationary grill includes a joystick aperture defined therein, and wherein said joystick is positioned within said joystick aperture such that said joystick can move in said first direction and said second direction.

6. The air vent assembly of claim 1, wherein each of said second vanes and each of said first vanes is constructed of a thermoplastic material.

7. The air vent assembly of claim 1, wherein said first plurality of vanes includes at least three vanes.

8. The air vent of claim 1, wherein said second plurality of vanes includes at least three vanes.

9. An air vent assembly for directing air in a passenger compartment of a vehicle, said air vent assembly comprising:

a housing having an inlet and an outlet;

a first set of vanes, each of said first set of vanes being rotatably secured to said housing, each of said first set of vanes rotating about one of a first set of parallel axes, and at least one of said first set of vanes having a first indentation defined therein;

a second set of vanes, each of said second set of vanes being rotatably secured to said housing, each of said second set of vanes rotating about one of a second set of parallel axes, and at least one of said second set of vanes having a second indentation defined therein; and a joystick having (i) a ball joint disposed in a socket formed by said first indentation and said second indentation, (ii) a forward shaft engaging at least one of said first set of vanes to impart rotational motion thereto; (iii) a rear shaft engaging at least one of said second set of vanes to impart rotational motion thereto.

10. The air vent assembly of claim 1 wherein said ball joint is received by a socket formed by at least one of said first plurality of vanes and at least one of said second plurality of vanes.

11. The air vent assembly of claim 3 wherein at least one of the second plurality of vanes includes a slot defined therein, said slot configured to receive the rear shaft of the joystick.

12. An air vent assembly for directing air in a passenger compartment of a vehicle, said air vent assembly comprising:

a housing having an inlet and an outlet;

a first set of vanes, each of said first set of vanes being rotatably secured to said housing, each of said first set of vanes rotating about one of a first set of substantially parallel axes, and at least one of said first set of vanes having a first indentation defined therein;

a second set of vanes, each of said second set of vanes being rotatably secured to said housing, each of said second set of vanes rotating about one of a second set of substantially parallel axes, and at least one of said second set of vanes having a second indentation defined therein; and a joystick having a ball joint disposed in a socket formed by said first indentation and said second indentation, said joystick engaging at least one of said first set of vanes to impart rotational motion thereto, said joystick engaging at least one of said second set of vanes to impart rotational motion thereto.

13. The air vent assembly of claim 12 wherein the first set of substantially parallel axes and the second set of substantially parallel axes are substantially coplanar.

14. The air vent assembly of claim 12 wherein each of the first set of substantially parallel axes is substantially perpendicular to each of the second set of substantially parallel axes.

15. The air vent assembly of claim 12 further comprising a stationary grill covering said outlet of said housing.

16. The air vent assembly of claim 12 wherein the first set of vanes defines a first plurality of v-shaped notches and wherein the second set of vanes defines a second plurality of v-shaped notches.

17. The air vent assembly of claim 9 wherein the first set of parallel axes and the second set of parallel axes are substantially coplanar.

18. The air vent assembly of claim 9 wherein each of the first set of parallel axes is substantially perpendicular to each of the second set of parallel axes.

19. The air vent assembly of claim 9 further comprising a stationary grill covering said outlet of said housing.

20. The air vent assembly of claim 9 wherein the first set of vanes defines a first plurality of v-shaped notches and wherein the second set of vanes defines a second plurality of v-shaped notches.

* * * * *